US006772144B2

(12) United States Patent
Brid et al.

(10) Patent No.: US 6,772,144 B2
(45) Date of Patent: Aug. 3, 2004

(54) METHOD AND APPARATUS FOR APPLYING AN ADAPTIVE LAYOUT PROCESS TO A LAYOUT TEMPLATE

(75) Inventors: Regis Lucien Francis Brid, Bothell, WA (US); Shanku Shivabrata Niyogi, Bellevue, WA (US); Greg Schechter, Seattle, WA (US); David Joshua Kurlander, Seattle, WA (US); John D. Rinaldo, Jr., Bellevue, WA (US); Chun-Fu Ricky Yeung, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 275 days.

(21) Appl. No.: 09/773,457

(22) Filed: Jan. 31, 2001

(65) Prior Publication Data

US 2002/0143822 A1 Oct. 3, 2002

(51) Int. Cl.$^7$ .................. G06F 17/30; G06F 15/00; G06K 9/68
(52) U.S. Cl. .................. 707/3; 715/517; 382/217
(58) Field of Search .................. 707/1, 6, 10, 104.1, 707/201, 500, 517, 526; 455/3.01; 715/500.1, 517, 521, 526; 382/217, 218

(56) References Cited

U.S. PATENT DOCUMENTS

| | | | | |
|---|---|---|---|---|
| 2001/0034771 A1 | * | 10/2001 | Hutsch et al. | 709/217 |
| 2001/0052910 A1 | * | 12/2001 | Parekh et al. | 345/744 |
| 2002/0015042 A1 | * | 2/2002 | Robotham et al. | 345/581 |
| 2002/0095459 A1 | * | 7/2002 | Laux et al. | 709/203 |

OTHER PUBLICATIONS

John Warnock et al., "A Device Independent Graphics Imaging Model for Use with Raster Devices", Computer Graphics, vol. 16, No. 3, Jul. 1982, pp. 313–319.
Anneli Heimburger, "Introduction to Standard Generalized Markup Language (SGML)", Microcomputers for Information Management, 11(4): 239–260 (1994), 24 pages.
Tony McKinley, "How Adobe's Portable Document Format evolved and how it can facilitate document management", inform, Sep. 1997, 5 pages.
Stefan Stille et al., "Adaptive Layout Calculation in Graphical User Interfaces: A Retrospective on the A 2DL–Project", pp. 185–198.
OPENTV, "Spyglass Prism From OpenTV", Apr. 2000, 4 pages.
IBM, "IBM transcoding solution and service: Extending the reach and exploiting the value of data", May 1999, 8 pages.
Oracle Portal–To–Go, "An Oracle Business White Paper", Jan. 2000, 5 pages.

* cited by examiner

*Primary Examiner*—Alford Kindred
(74) *Attorney, Agent, or Firm*—Lee & Hayes, PLLC (57) ABSTRACT

A system retrieves a first template associated with data identified in a data request. A second template is generated using the first template and a device description, which is associated with a device generating the data request. The first template is device independent and the second template is associated with the specific device generating the data request as well as the first template. The second template defines a data presentation format for displaying the requested data on the type of device that generated the data request. The second template is stored in a cache, which allows the second template to be used with multiple sets of data without regenerating the template. The requested data is retrieved from a data source and formatted based on the second template. The formatted data is then transmitted to the device generating the data request.

29 Claims, 5 Drawing Sheets

```
300 ─┐   ┌─────────────────────┐
     └──▶│       MSFT          │
        │ Closing Value: 92.50 │
        │ Date: 9-17-99        │
        │ Volume: 1,234,830    │
        │ Change: +1.25        │
        │     Next Symbol      │
        └─────────────────────┘
```

*Fig. 4*

```
320 ─┐   ┌──────────────────────────────────┐
     └──▶│              MSFT                │
        │ Closing Value: 92.50             │
        │ Date: 9-17-99   Change: +1.25    │
        │ Volume: 1,234,830                │
        │          Next Symbol             │
```

```
        │                                  │
        │    M   Tu   W   Th   F           │
        │       5 DAY PERFORMANCE          │
        └──────────────────────────────────┘
```

METHOD AND APPARATUS FOR APPLYING AN ADAPTIVE LAYOUT PROCESS TO A LAYOUT TEMPLATE

TECHNICAL FIELD

The present invention relates to the manipulation and display of data. More particularly, the present invention allows the display of a particular set of data on a variety of different devices having different display types.

BACKGROUND

Various types of devices are able to receive web page content. These devices include computer systems (such as desktop systems, laptops, and handheld computers), cellular phones, Personal Digital Assistants (PDAs), and other computing devices. These different devices may have different types of displays for displaying data (e.g., different display sizes, different aspect ratios, and different display resolutions). Furthermore, certain devices may have color displays while other devices have a monochrome or gray-scale display. Certain device displays are capable of displaying only text characters while other device displays can display text characters as well as pictures or other graphical information.

Different types of devices receive web page content at different speeds depending on the bandwidth and traffic volume of the communication link between the device and the data source. Thus, the time required to transmit similar web page content is likely to vary from one type of device to another. Users of devices having a slow communication link (caused by reduced bandwidth or increased traffic volume) may want to receive an abbreviated version of the web page content, thereby reducing the time required to transmit the data across the communication link.

Web content developers may want to create web pages that can be received and rendered by multiple types of devices having different types of displays. One solution that supports multiple devices and multiple display types includes annotating each individual web page with information that will allow the web page to be rendered by different types of devices having different types of displays. Separate annotations are required for each type of device and/or each type of display to be supported by the web page. This solution is tedious and time-consuming due to the large number of device types and display types. Further, if new devices or new display types are developed in the future, the web content may require modification to support these new devices or display types.

Another solution that supports multiple devices and/or display types includes creating a separate web page for each type of device and display type that the web content developer desires to support. This solution is also tedious and time-consuming, and requires the creation of additional web pages in the future if new devices or display types are released. This solution also increases the storage space requirements due to the creation of multiple versions of the same web page content.

The system and method described herein addresses these limitations by applying an adaptive layout process to a layout template.

SUMMARY

The systems and methods described herein allow a set of data to be formatted for different devices having different types of displays. Using these systems and methods, the content developer is able to create their data content once and have the data content adapted to a variety of different devices and device displays. Once generated, device-specific templates are cached to reduce the processing resources required to display different sets of data on the same type of device.

A particular embodiment retrieves a first template associated with data identified in a data request. A second template is generated using the first template and a device description, which is associated with a device generating the data request.

In one embodiment, the first template is device independent and the second template is associated with the specific device generating the data request and the first template.

In a described embodiment, the second template defines a data presentation format for displaying the requested data on the device generating the data request.

In a particular embodiment, the second template is stored in a cache.

A particular embodiment also retrieves the requested data from a data source and generates formatted data based on the second template and the requested data. The formatted data is then transmitted to the device generating the data request.

DETAILED DESCRIPTION

The systems and methods described herein allow the display of data on different types of devices having different types of displays. These systems and methods allow a content developer (e.g., a web content developer) to create their content structure once and have that content structure adapted to a variety of different devices and device displays. This content structure may also be adapted to other devices and/or displays developed in the future. For example, a web content developer can develop a layout (or content structure) for an entire family of web pages, thereby avoiding the tedious process of creating a separate layout for each web page. The use of such a layout reduces the processing time required by a server or other computing device, because a particular layout is processed once and the results of that processing are saved and used again for any other web pages in the family.

Figure 1:
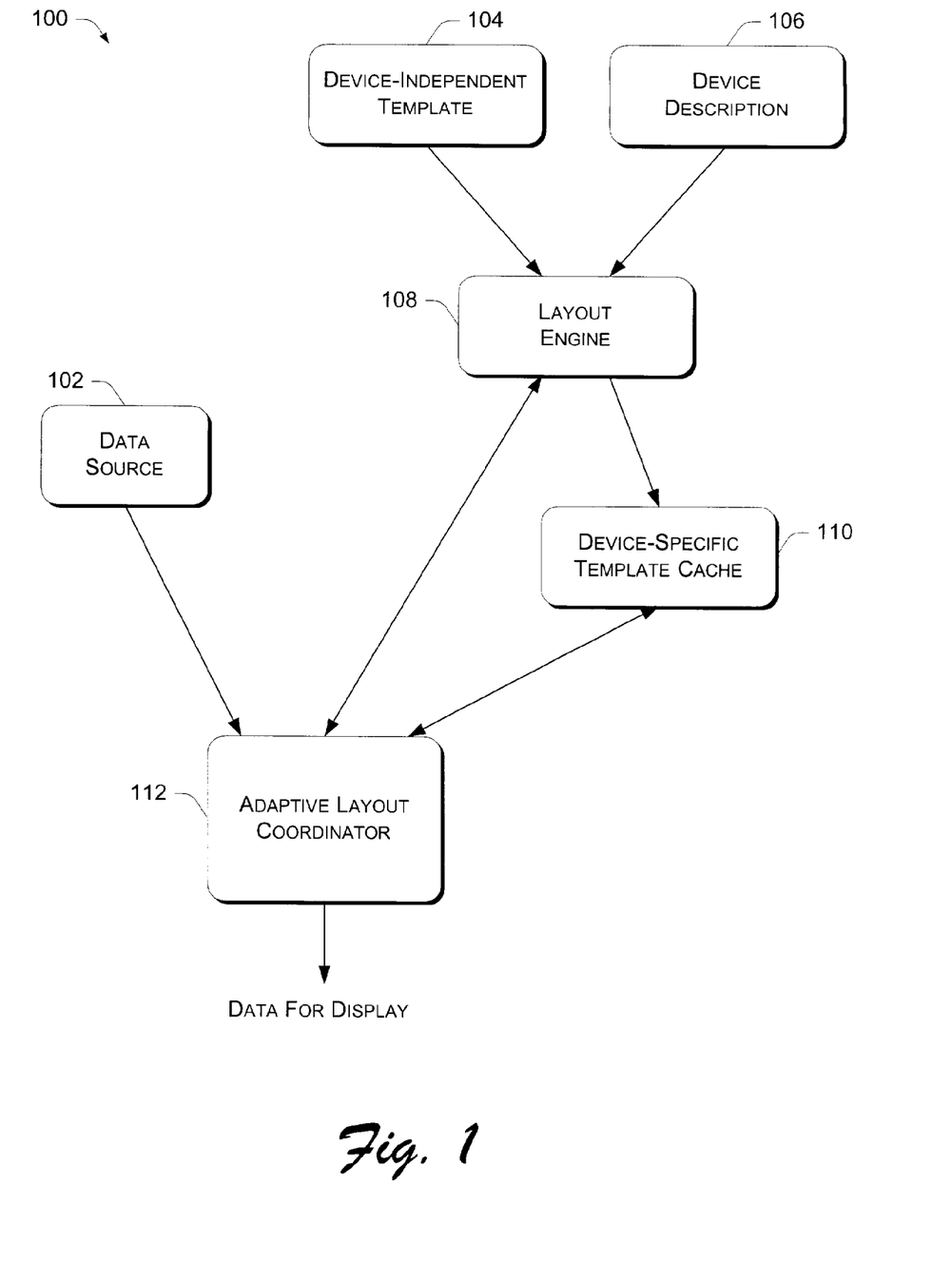
FIG. 1 illustrates a block diagram of a system that is capable of generating data for display on one of multiple different devices having different types of displays.

FIG. 1 illustrates a block diagram of a system 100 that is capable of generating data for display on one of multiple different devices having different types of displays. A data source 102 may be accessed by users requesting data from the data source. Data source 102 may be implemented using any type of device. In a particular embodiment, data source 102 is a web server (also referred to as an Internet server) capable of being accessed via a web browser or similar application. For example, a user may access data source 102 using a web browser application executing on a computer, cellular phone, Personal Digital Assistant (PDA), or any other device coupled to the Internet. Although particular embodiments are described with reference to web-based (or Internet-based) systems, the systems and methods discussed herein can be applied to any type of data source that is accessed using any type of application or method.

Data source 102 provides information regarding user requests for data as well as the requested data to an adaptive layout coordinator 112. Adaptive layout coordinator 112 manipulates and formats the data received from data source 102 such that the data will be properly displayed on the device requesting the data. Adaptive layout coordinator 112 may be any type of processing system (hardware and/or software) capable of performing the various tasks discussed herein.

A device-independent template 104 contains information related to a family of web pages or a collection of particular types of data. Device-independent templates 104 are typically generated by a web content developer. For example, a device-independent template 104 may be provided for defining how to display stock quote information. The device-independent template 104 is not limited to displaying information about a particular stock, but instead defines how to display information related to any stock. The device-independent template 104 provides a generic data binding representation (i.e., a data binding representation that is not associated with any particular device).

A device description 106 includes information about a particular device (or a particular type of device), such as a cellular phone, handheld computer, or PDA. Device description 106 may include information related to the capabilities and features of the device as well as information regarding the type of display contained in the device. Table 1 below provides an example of the types of information that may be contained in a device description 106.

TABLE 1

| Device Parameter | Value |
| --- | --- |
| Device Type | Handheld-PC |
| Communication Link | Wireless-RF |
| Communication Rate | 128 k |
| Display Type | Color |
| Display Resolution | 240 × 320 |
| Graphics | Yes |
| GPS Functionality | Yes |
| Telephone Functionality | No |
| Markup Language | HTML |

In the example of Table 1, the device is a handheld computer that can communicate via a wireless communication link at rates up to 128 k bits per second. The handheld computer includes a color display capable of displaying graphics (as well as text) and has a resolution of 240×320. The handheld computer includes Global Positioning System (GPS) functionality, but does not include telephone functionality (e.g., an integrated cellular phone). Finally, Table 1 indicates that the handheld computer accepts the Hyper Text Markup Language (HTML). Other parameters that may be contained in a device description include the color depth (e.g., 8, 16 or 24 bits), whether the device supports cookies, and the type of browser used by the device.

A layout engine 108 receives device-independent template 104 and device description 106 and generates a device-specific template, which is stored in a device-specific template cache 110. The device-specific template is a device-dependent data binding representation that defines how data is to be displayed on a particular type of device (for example, one or more Pocket PC models). Although each device-specific template is associated with a particular device type, the template can be used repeatedly to display different sets of data on the associated device type. Caching the device-specific template in cache 110 allows adaptive layout coordinator 112 to use the same template for multiple sets of data, thereby reducing the computational resources required to format data for display on a particular device type.

In a particular embodiment, device-independent template 104, device description 106, layout engine 108, device-specific template 110, and adaptive layout coordinator 112 are contained in a web server or similar computing mechanism.

Figure 2:
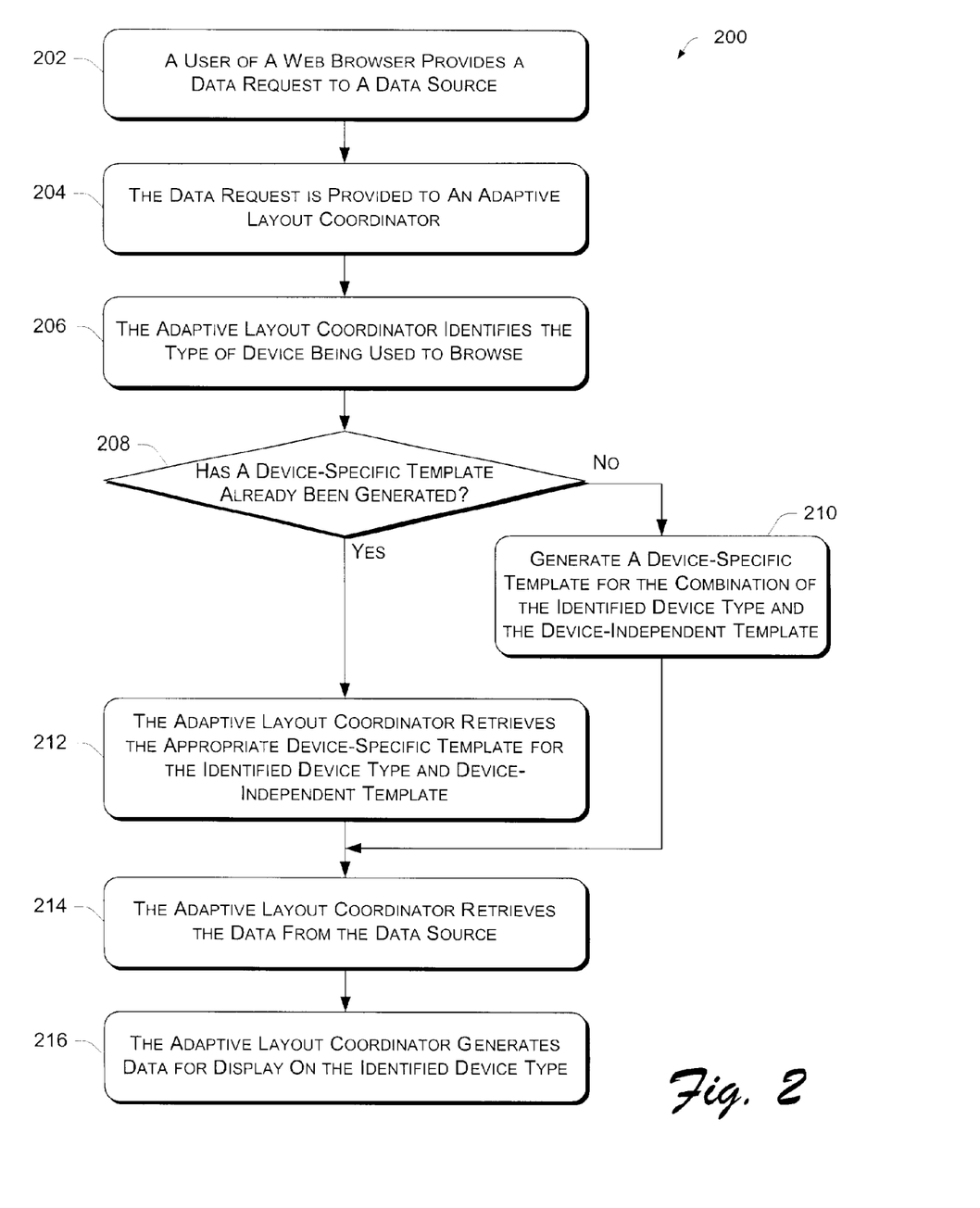
FIG. 2 is a flow diagram illustrating a procedure for generating data that is properly formatted for display on a particular device.

FIG. 2 is a flow diagram illustrating a procedure 200 for generating data that is properly formatted for display on a particular device. A user of a web browser provides a data request to a data source, such as a web server (block 202). The web browser may be executing on a desktop or laptop computer, cellular phone, PDA, or other computing device. The request may be for any type of data or information, such as stock quotes, weather forecasts, news stories, maps, business directories or scores of sporting events. The requested data may be contained in any type of data storage structure, such as a web page or database. The user of the web browser identifies a particular set of data using, for example, a Uniform Resource Locator (URL) associated with a web page.

The data request received by the data source is provided to an adaptive layout coordinator (block 204). The adaptive layout coordinator identifies the type of device being used to browse (block 206). For example, the device may be identified as a specific model of cellular phone, PDA or other computing device. The adaptive layout coordinator identifies the device type using, for example, device identifier information encoded in an HTTP header sent with the data request.

At block 208, the adaptive layout coordinator determines whether a device-specific template has already been generated for the combination of the identified device type and the device-independent template. If not, the procedure 200 branches to block 210, which generates a device-specific template for the combination of the identified device type and the device-independent template. The generation of device-specific templates is discussed in greater detail with reference to FIG. 3. If a device-specific template has already been generated, the adaptive layout coordinator retrieves the appropriate device-specific template (e.g., from the device-specific template cache) for the identified device type and device-independent template (block 212). If a device-specific template has already been generated, significant processing resources are conserved by avoiding the regeneration of the device-specific template. The adaptive layout coordinator then retrieves the requested data from the data source (block 214) and generates the data for display on the identified device type (block 216). Generation of the data for display on the identified device type includes manipulating the data into a format specified by the device-specific template. The generated data is then communicated to the requesting device for display.

As discussed above, the device-specific template is associated with a particular device type and a device-independent template. In an alternate embodiment, the device-specific template is associated with a set of device types rather than a single device type. For example, a particular device-specific template may be associated with a particular device-independent template and all PDAs having a 240×320 resolution that accept HTML.

Figure 3:
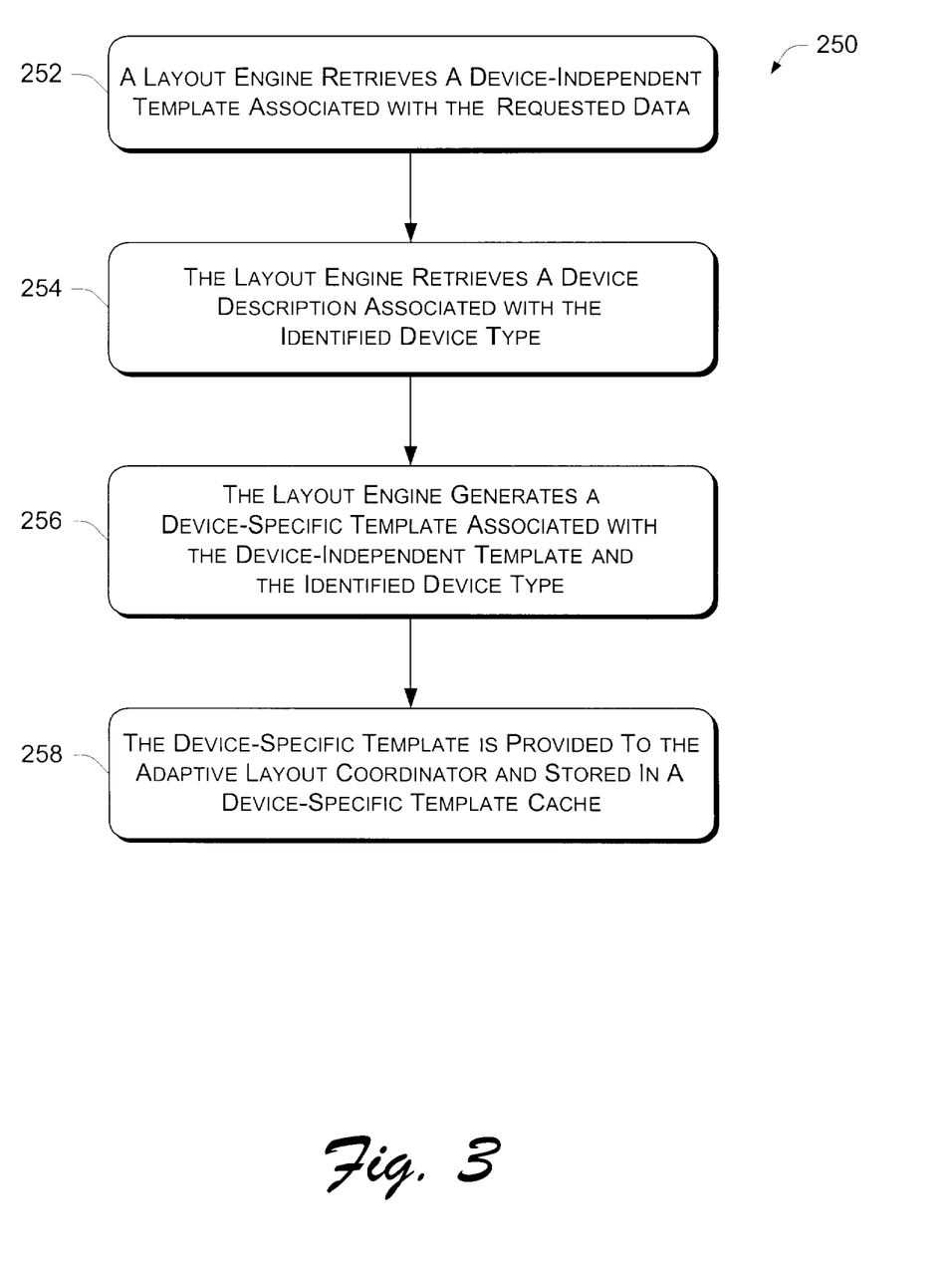
FIG. 3 is a flow diagram illustrating a procedure for generating a device-specific template for a particular type of device.

FIG. 3 is a flow diagram illustrating a procedure 250 for generating a device-specific template for a particular type of device (i.e., block 210 in FIG. 2). A layout engine retrieves a device-independent template associated with the requested data (block 252). For example, information identifying the particular device-independent template can be included in the request sent from the data source to the adaptive layout coordinator. The adaptive layout coordinator then communicates that information to the layout engine in a request to generate a device-specific template, which will allow the adaptive layout coordinator to properly format the requested data for display on the requesting device.

The layout engine also retrieves a device description associated with the identified device type (block 254). The layout engine then generates a device-specific template that is associated with the device-independent template and the identified device type (block 256). The device-specific template is provided to the adaptive layout coordinator and stored in a device-specific template cache for future access by the adaptive layout coordinator (block 258).

Figure 4:
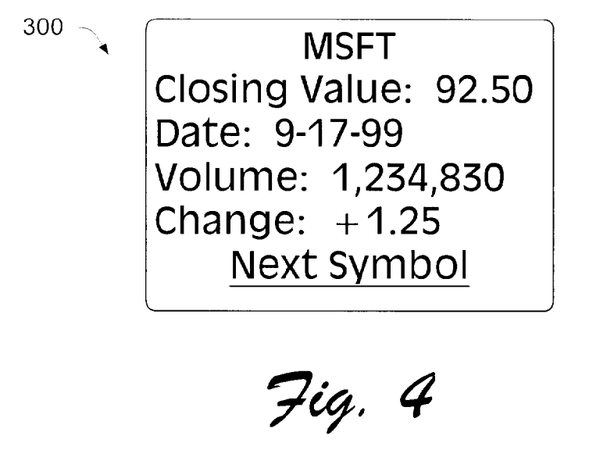
FIG. 4 illustrates a display of information on a small display, such as the display on a cellular telephone.

FIG. 4 illustrates a display of information on a small display 300, such as the display on a cellular telephone. As shown in FIG. 4, display 300 is presenting information related to a particular stock. Since display 300 is relatively small, the information displayed is limited to the stock symbol, closing price, closing date, trading volume, and the change in price. Display 300 also includes a link to information related to the next stock symbol. A particular user may request data regarding several different stocks. The size of display 300 limits the amount of information that can be shown at a particular time. Therefore, the user selects the "Next Symbol" link to display information related to the next requested stock.

Figure 5:
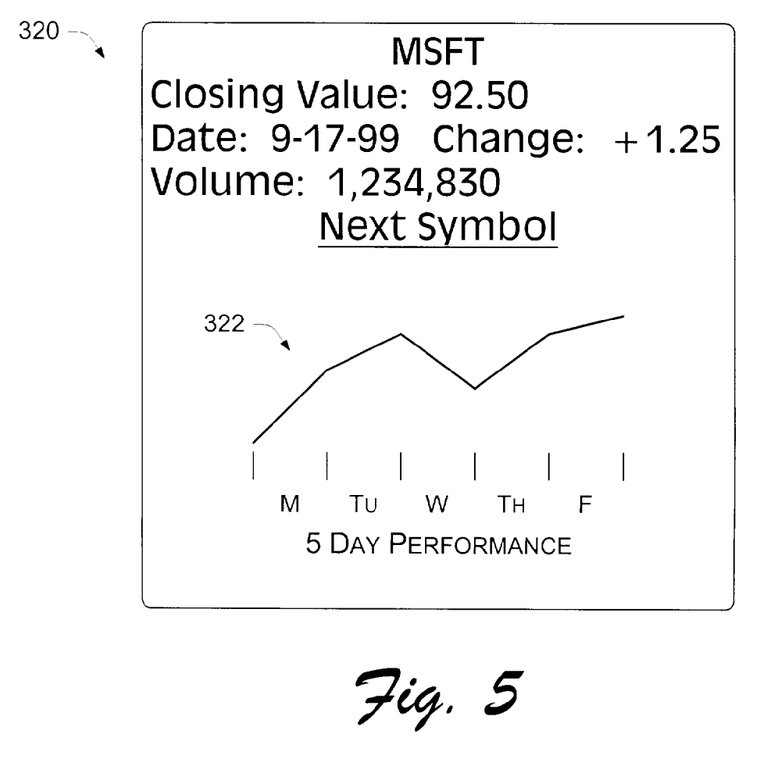
FIG. 5 illustrates another display of information on a larger display, such as a PDA or a handheld computer.

FIG. 5 illustrates another display of information on a larger display 320, such as a PDA or a handheld computer. Since display 320 is larger, additional information can be displayed when compared with the smaller display 300. In the example of FIG. 5, display 320 includes the stock information shown in FIG. 4 as well as a graph 322 illustrating the stock's performance over the last five days. Alternatively, the larger display 320 can be used to display information (i.e., closing value, trading volume, etc.) related to two different stocks simultaneously.

The manner in which the stock-related information is displayed is determined by the device-specific template. For example, the same data is accessed for display in both FIG. 4 and FIG. 5. The difference between the actual data elements displayed is determined by the device-specific template. The device-specific template defines the data elements to be displayed and the arrangement of data elements on the display. Once the data is retrieved, the template is "filled-in" by positioning the necessary data elements in the proper locations. This formatted data is then communicated to the requesting device for display. Since display 300 is not large enough to effectively display a five-day performance chart, the device-specific template does not use the five-day performance data. However, since the larger display 320 is able to display the five-day performance chart, that data is identified in the device-specific template used to generate the data displayed in FIG. 5.

Figure 6:
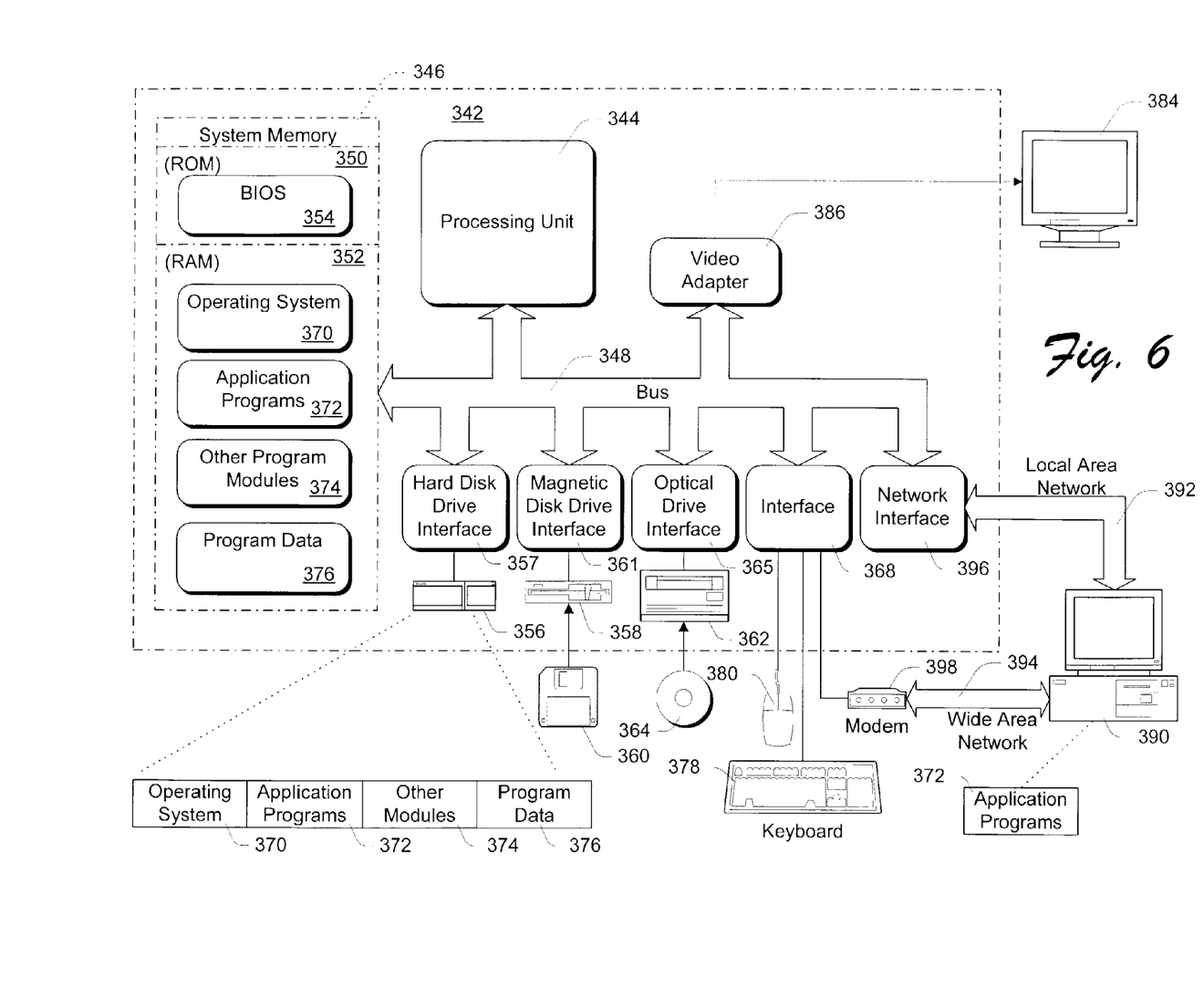
FIG. 6 illustrates an example of a suitable operating environment in which the systems and methods described herein may be implemented.

FIG. 6 illustrates an example of a suitable operating environment in which the systems and methods discussed herein may be implemented. The illustrated operating environment is only one example of a suitable operating environment and is not intended to suggest any limitation as to the scope of use or functionality of the invention. Other well known computing systems, environments, and/or configurations that may be suitable for use with the invention include, but are not limited to, personal computers, server computers, hand-held or laptop devices, multiprocessor systems, microprocessor-based systems, programmable consumer electronics, gaming consoles, cellular telephones, network PCs, minicomputers, mainframe computers, distributed computing environments that include any of the above systems or devices, and the like.

FIG. 6 shows a general example of a computer 342 that can be used in accordance with the invention. Computer 342 is shown as an example of a computer that can perform the various functions described herein. Computer 342 includes one or more processors or processing units 344, a system memory 346, and a bus 348 that couples various system components including the system memory 346 to processors 344.

The bus 348 represents one or more of any of several types of bus structures, including a memory bus or memory controller, a peripheral bus, an accelerated graphics port, and a processor or local bus using any of a variety of bus architectures. The system memory 346 includes read only memory (ROM) 350 and random access memory (RAM) 352. A basic input/output system (BIOS) 354, containing the basic routines that help to transfer information between elements within computer 342, such as during start-up, is stored in ROM 350. Computer 342 further includes a hard disk drive 356 for reading from and writing to a hard disk, not shown, connected to bus 348 via a hard disk drive interface 357 (e.g., a SCSI, ATA, or other type of interface); a magnetic disk drive 358 for reading from and writing to a removable magnetic disk 360, connected to bus 348 via a magnetic disk drive interface 361; and an optical disk drive 362 for reading from and/or writing to a removable optical disk 364 such as a CD ROM, DVD, or other optical media, connected to bus 348 via an optical drive interface 365. The drives and their associated computer-readable media provide nonvolatile storage of computer readable instructions, data structures, program modules and other data for computer 342. Although the exemplary environment described herein employs a hard disk, a removable magnetic disk 360 and a removable optical disk 364, it will be appreciated by those skilled in the art that other types of computer readable media which can store data that is accessible by a computer, such as magnetic cassettes, flash memory cards, random access memories (RAMs), read only memories (ROM), and the like, may also be used in the exemplary operating environment.

A number of program modules may be stored on the hard disk, magnetic disk 360, optical disk 364, ROM 350, or RAM 352, including an operating system 370, one or more application programs 372, other program modules 374, and program data 376. A user may enter commands and information into computer 342 through input devices such as keyboard 378 and pointing device 380. Other input devices (not shown) may include a microphone, joystick, game pad, satellite dish, scanner, or the like. These and other input devices are connected to the processing unit 344 through an interface 368 that is coupled to the system bus (e.g., a serial port interface, a parallel port interface, a universal serial bus (USB) interface, etc.). A monitor 384 or other type of display device is also connected to the system bus 348 via an interface, such as a video adapter 386. In addition to the monitor, personal computers typically include other peripheral output devices (not shown) such as speakers and printers.

Computer 342 operates in a networked environment using logical connections to one or more remote computers, such as a remote computer 388. The remote computer 388 may be another personal computer, a server, a router, a network PC, a peer device or other common network node, and typically includes many or all of the elements described above relative to computer 342, although only a memory storage device 390 has been illustrated in FIG. 6. The logical connections depicted in FIG. 6 include a local area network (LAN) 392 and a wide area network (WAN) 394. Such networking environments are commonplace in offices, enterprise-wide computer networks, intranets, and the Internet. In certain embodiments, computer 342 executes an Internet Web browser program (which may optionally be integrated into the operating system 370) such as the "Internet Explorer" Web browser manufactured and distributed by Microsoft Corporation of Redmond, Wash.

When used in a LAN networking environment, computer 342 is connected to the local network 392 through a network interface or adapter 396. When used in a WAN networking environment, computer 342 typically includes a modem 398 or other means for establishing communications over the wide area network 394, such as the Internet. The modem 398, which may be internal or external, is connected to the system bus 348 via a serial port interface 368. In a networked environment, program modules depicted relative to the personal computer 342, or portions thereof, may be stored in the remote memory storage device. It will be appreciated that the network connections shown are exemplary and other means of establishing a communications link between the computers may be used.

Computer 342 typically includes at least some form of computer readable media. Computer readable media can be any available media that can be accessed by computer 342. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by computer 342. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as wired network or direct-wired connection, and wireless media such as acoustic, RF, infrared and other wireless media. Combinations of any of the above should also be included within the scope of computer readable media.

The invention has been described in part in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

For purposes of illustration, programs and other executable program components such as the operating system are illustrated herein as discrete blocks, although it is recognized that such programs and components reside at various times in different storage components of the computer, and are executed by the data processor(s) of the computer.

Thus, a system and method has been described that handles the display of data on different types of devices having different display types. This adaptive user interface formats data according to a device-specific template associated with the device requesting the data and a device-independent template associated with the data. The same set of data may be displayed differently on different devices based on the device-specific template. Similarly, the same device-specific template can be used to display different sets of data on the same device.

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

What is claimed is:

1. A method comprising:

receiving a data request generated by a device;

retrieving a device-independent template associated with the requested data;

retrieving a device description associated with the device generating the data request;

generating a device-specific template based on the device-independent template and the device description; and displaying different sets of data on the device using the device-specific template.

2. A method as recited in claim 1 wherein the device-independent template is associated with a collection of data.

3. A method as recited in claim 1 wherein the device-specific template is associated with the device generating the data request and the device-independent template.

4. A method as recited in claim 1 wherein the device-specific template is associated with the device-independent template and a set of device types, wherein the set of device types includes the device type generating the data request.

5. A method as recited in claim 1 wherein the device-specific template is data independent.

6. A method as recited in claim 1 wherein the device-specific template defines a data presentation format for displaying the requested data on the device generating the data request.

7. A method as recited in claim 1 further comprising storing the device-specific template in a cache.

8. A method as recited in claim 1 further comprising providing the device-specific template to an adaptive layout coordinator.

9. A method as recited in claim 1 further comprising:

retrieving the requested data from a data source; and generating formatted data based on the device-specific template and the requested data.

10. A method as recited in claim 1 further comprising:
retrieving the requested data from a data source;
generating formatted data based on the device-specific template and the requested data; and
transmitting the formatted data to the device generating the data request.

11. A method as recited in claim 1 wherein the device is a wireless device.

12. A method as recited in claim 1 wherein the device is a portable computing device.

13. A method as recited in claim 1 wherein the data request is received from a data source.

14. One or more computer-readable memories containing a computer program that is executable by a processor to perform the method recited in claim 1.

15. A method comprising:
retrieving a device-independent template associated with a collection of data;
retrieving a device description associated with a device type that identifies at least one device;
generating a device-specific template based on the device-independent template and the device description, wherein the device-specific template is associated with the device type;
storing the device-specific template in a cache;
receiving a data request from a requesting device, wherein the requesting device is associated with the device type;
retrieving the device-specific template from the cache;
retrieving the requested data; and
generating formatted data based on the device-specific template and the requested data, wherein the formatted data is configured for display on the requesting device.

16. A method as recited in claim 15 further comprising:
receiving a second data request from a second requesting device, wherein the second requesting device is associated with the device type;
retrieving the data requested in the second data request; and
generating second formatted data based on the device-specific template and the data requested in the second data request, wherein the second formatted data is configured for display on the second requesting device.

17. A method as recited in claim 15 further comprising:
receiving a second data request from the requesting device;
retrieving the data requested in the second data request; and
generating second formatted data based on the device-specific template and the data requested in the second data request.

18. A method as recited in claim 17 wherein the device description includes information regarding display capabilities of the device type.

19. A method as recited in claim 17 wherein the formatted data is communicated to the requesting device.

20. One or more computer-readable memories containing a computer program that is executable by a processor to perform the method recited in claim 15.

21. An apparatus comprising:
a first processing engine configured to retrieve a device-independent template associated with a set of data and configured to retrieve a device description associated with a requesting device, wherein the device description includes information regarding the display capabilities of the requesting device, the first processing engine further configured to create a device-specific template based on the device-independent template and the device description; and
a second processing engine coupled to the first processing engine and configured to format data based on the device-specific template and the set of data.

22. An apparatus as recited in claim 21 wherein the device-independent template is associated with a collection of data.

23. An apparatus as recited in claim 21 wherein the device-specific template is associated with a particular device and the device-independent template.

24. An apparatus as recited in claim 21 wherein the device-specific template is associated with the device-independent template and a set of device types, wherein the set of device types includes the type of requesting device.

25. An apparatus as recited in claim 21 wherein the second processing engine is further configured to transmit the formatted data to the requesting device.

26. An apparatus as recited in claim 21 further comprising a cache coupled to the first processing engine and the second processing engine, the cache configured to store the device-specific template.

27. One or more computer-readable media having stored thereon a computer program that, when executed by one or more processors, causes the one or more processors to:
receive a request for data from a device;
retrieve the requested data;
determine whether a device-specific template associated with the device is available from a cache;
if the device-specific template is available from the cache:
retrieve the device-specific template from the cache; and
generate formatted data based on the device-specific template and the requested data; if the device-specific template is not available from the cache:
retrieve a device-independent template associated with the requested data;
retrieve a device description associated with the device;
generate a device-specific template based on the device-independent template and the device description; and
generate formatted data based on the device-specific template and the requested data.

28. One or more computer-readable media as recited in claim 27 wherein the device-specific template identifies a data presentation format for displaying the requested data on the device.

29. One or more computer-readable media as recited in claim 27 wherein the computer program further causes the one or more processors to communicate the formatted data to the device.

* * * * *